United States Patent
Paek et al.

(10) Patent No.: US 9,417,498 B2
(45) Date of Patent: Aug. 16, 2016

(54) LIQUID CRYSTAL DISPLAY

(71) Applicant: Samsung Display Co., Ltd., Yongin, Gyeonggi-Do (KR)

(72) Inventors: Hye-Jin Paek, Yongin-si (KR); Chang Hun Kwak, Suwon-si (KR); Sang Hun Lee, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/730,349

(22) Filed: Jun. 4, 2015

(65) Prior Publication Data

US 2016/0202582 A1 Jul. 14, 2016

(30) Foreign Application Priority Data

Jan. 9, 2015 (KR) .................. 10-2015-0003672

(51) Int. Cl.
*G02F 1/136* (2006.01)
*G02F 1/1362* (2006.01)
*G02F 1/1368* (2006.01)
*G02F 1/1333* (2006.01)

(52) U.S. Cl.
CPC ........ *G02F 1/136286* (2013.01); *G02F 1/1368* (2013.01); *G02F 1/133345* (2013.01); *G02F 1/136209* (2013.01); *G02F 1/136227* (2013.01); *G02F 2001/136218* (2013.01); *G02F 2001/136222* (2013.01)

(58) Field of Classification Search
CPC .............. G02F 1/136259; G02F 2001/136263; G02F 2001/136272; G02F 2001/1357; G02F 2001/136218; G02F 1/136204; G02F 1/136218

See application file for complete search history.

(56) References Cited

U.S. PATENT DOCUMENTS

2012/0105777 A1* 5/2012 Lee ................... H01L 27/124
349/106
2015/0103296 A1 4/2015 Kwak et al.

FOREIGN PATENT DOCUMENTS

KR 1020140017401 A 2/2014
KR 1020140086395 A 7/2014
KR 1020140098402 A 8/2014

* cited by examiner

*Primary Examiner* — Phu Vu
(74) *Attorney, Agent, or Firm* — Cantor Colburn LLP (57) ABSTRACT

A liquid crystal display includes: gate and data lines; a thin film transistor connected to the gate and data lines; a pixel electrode connected to the thin film transistor, including first and second sub-pixel electrodes; a shielding electrode member on the data line, including first and second shielding electrodes respectively at opposing sides of the pixel electrode, each shielding electrode including: an expanded part between the first and second sub-pixel electrodes, and a vertical part elongated from the expanded part in a first direction parallel to the data line; and a light blocking member elongated in a second direction crossing the first direction, overlapping the thin film transistor. A second direction width of the expanded part is larger than that of the vertical part, and opposing edges of the expanded part overlap the elongated light blocking member overlapping the thin film transistor.

19 Claims, 8 Drawing Sheets

LIQUID CRYSTAL DISPLAY

This application claims priority to Korean Patent Application No. 10-2015-0003672 filed on Jan. 9, 2015, and all the benefits accruing therefrom under 35 U.S.C. §119, the entire contents of which are incorporated herein by reference.

BACKGROUND (a) Field

The invention relates to a liquid crystal display.

(b) Description of the Related Art

The liquid crystal display is one among flat panel displays which have been most widely used. The liquid crystal display includes two sheets of display panels in which a field generating electrode is disposed, and a liquid crystal layer interposed between the two sheets of display panels. In the liquid crystal display, the field generating electrode is applied with a voltage to generate an electric field in the liquid crystal layer. An orientation of liquid crystal molecules of the liquid crystal layer is determined by the electric field and polarization of incident light is controlled based on the generated electric field to display an image.

Among liquid crystal displays, a liquid crystal display which is widely used has a structure in which field generating electrodes such as a pixel electrode and a common electrode are provided in two separate display panels, respectively. Such a liquid crystal display has a structure in which a first display panel (hereinafter, referred to as 'thin film transistor array panel') among the two separate display panels includes therein a plurality of thin film transistors and pixel electrodes arranged in a matrix form and a second display panel (hereinafter, referred to as 'common electrode panel') among the two separate display panels includes therein red, green, and blue color filters, and the whole surface of the second display panel is covered with a common electrode.

In the above-described liquid crystal display, components thereof may be misaligned since accurately aligning the pixel electrode and the color filter which are disposed in different display panels may be difficult.

SUMMARY

In a liquid crystal display, a distance between the two display panels is referred to as a cell gap, and a liquid crystal layer is disposed in the cell gap. The cell gap affects operational characteristics of the liquid crystal display such as characteristics of a response speed, a contrast ratio, a viewing angle, luminance uniformity, and the like. When the cell gap is non-uniform, a uniform image is not displayed over an entirety of a screen of the liquid crystal display and thus image quality thereof may deteriorate. Therefore, to maintain a uniform cell gap over a entirety of the two display panels and the screen of the liquid crystal display, a spacer may be formed for one display panel among the two display panels. As the spacer, a column spacer ("CS") has been mainly used.

For simplification of a manufacturing process of a liquid crystal display, a light blocking member such as a black matrix and the spacer may be simultaneously formed. The light blocking member may be formed around a boundary between adjacent pixels in which color filters and signal lines such as data lines overlap each other. Such a light blocking member may be formed to extend further from a base substrate than a main column spacer portion of the spacer due to a stepped structure of underlying layers also disposed on the substrate. To solve this problem, an electrode of the respective display panel is disposed at an area where adjacent color filters overlap each other, but a light leakage problem occurs.

One or more exemplary embodiment of the invention provides a liquid crystal display having advantages of solving light leakage at a portion where color filters overlap each other.

An exemplary embodiment of the invention provides a liquid crystal display, including: a first display panel. The first display panel includes: a first insulating substrate; a gate line and a data line on the first insulating substrate, intersecting each other and being insulated from each other; a thin film transistor connected to the gate line and the data line; a pixel electrode connected to the thin film transistor, including a first sub-pixel electrode and a second sub-pixel electrode spaced apart from each other; a shielding electrode member on the data line, including a first shielding electrode and a second shielding electrode respectively at opposing sides of the pixel electrode, each of the first shielding electrode and the second shielding electrode including: an expanded part between the first sub-pixel electrode and the second sub-pixel electrode, and a vertical part elongated from the expanded part in a first direction parallel to the data line; and a light blocking member elongated in a second direction crossing the first direction to overlap the thin film transistor. A width in the second direction of the expanded part between the first sub-pixel electrode and the second sub-pixel electrode is larger than that of the vertical part, and opposing edges of the expanded part between the first sub-pixel electrode and the second sub-pixel electrode overlap the elongated light blocking member overlapping the thin film transistor.

At least one of the first sub-pixel electrode and the second sub-pixel electrode may include a protrusion protruding toward the gate line.

Both the first and second sub-pixel electrodes may include the protrusion, and the protrusion of the first sub-pixel electrode and the protrusion of the second sub-pixel electrode may face each other.

The shielding electrode member may further include an extension protruded in the second direction from one of the expanded parts between the first sub-pixel electrode and the second sub-pixel electrode.

The first display panel may further include a reference voltage line on the first insulating substrate; and a plurality of contact holes respectively exposing the thin film transistor and the reference voltage line. At least one protrusion of the pixel electrode and the extension of the shielding electrode member may overlap a contact hole among the plurality of contact holes.

The contact hole may overlap a portion of the pixel electrode except the at least one protrusion, and where the overlapped area of the contact hole and the portion of the pixel electrode may be less than about 50% of a planar area of the contact hole.

The shielding electrode member may further include a horizontal part elongated between the first sub-pixel electrode and the second sub-pixel electrode and may connect the first and second shielding electrodes to each other.

The extension of the shielding electrode member may protrude in the second direction from the expanded part of the second shielding electrode, and the horizontal part of the shielding electrode member may connect the expanded part of the first shielding electrode with the extension protruded from the expanded part of the second shielding electrode.

The light blocking member may extend along the gate line.

The light blocking member may include a cover part overlapping the protrusion of the at least one of the first sub-pixel electrode and the second sub-pixel electrode.

The liquid crystal display may further include color filters overlapping the pixel electrode, edges of which may overlap each other and the data line.

The shielding electrode member may overlap the overlapping edges of the color filters.

The shielding electrode member and the pixel electrode may be in a same layer of the first display panel among layers on the first insulating substrate and include a same material.

The liquid crystal display may further include a second display panel facing the first display panel. The second display may may include: a second insulating substrate; a common electrode on the second insulating substrate; and a liquid crystal layer between the pixel electrode of the first display panel and the common electrode of the second display panel.

The shielding electrode member may be applied with the same voltage as that of the common electrode.

According to one or more exemplary embodiment of the liquid crystal display in accordance with the invention, a stepped structure and light leakage where signal lines (e.g., gate and/or data conductors) and color filters overlap each other are reduced or effectively prevented.

Further, the effects which may be obtained or predicted by the exemplary embodiment of the invention will be directly or implicitly disclosed in the detailed description of the exemplary embodiments of the invention. That is, various effects which are predicted by the exemplary embodiments of the invention will be disclosed in the detailed description to be described below.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Hereinafter, exemplary embodiments of the invention will be described in detail with reference to the accompanying drawings. However, the invention is not limited to the exemplary embodiments set forth herein but may be modified in many different forms. On the contrary, exemplary embodiments introduced herein are provided to make disclosed contents thorough and complete and sufficiently transfer the spirit of the invention to those skilled in the art.

In the drawings, the thickness of layers, films, panels, regions, etc., are exaggerated for clarity. Further, it will be understood that when a layer is referred to as being "on" another layer or substrate, it can be directly on the other layer or substrate, or intervening them may also be present. Like reference numerals designate like elements throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 1:
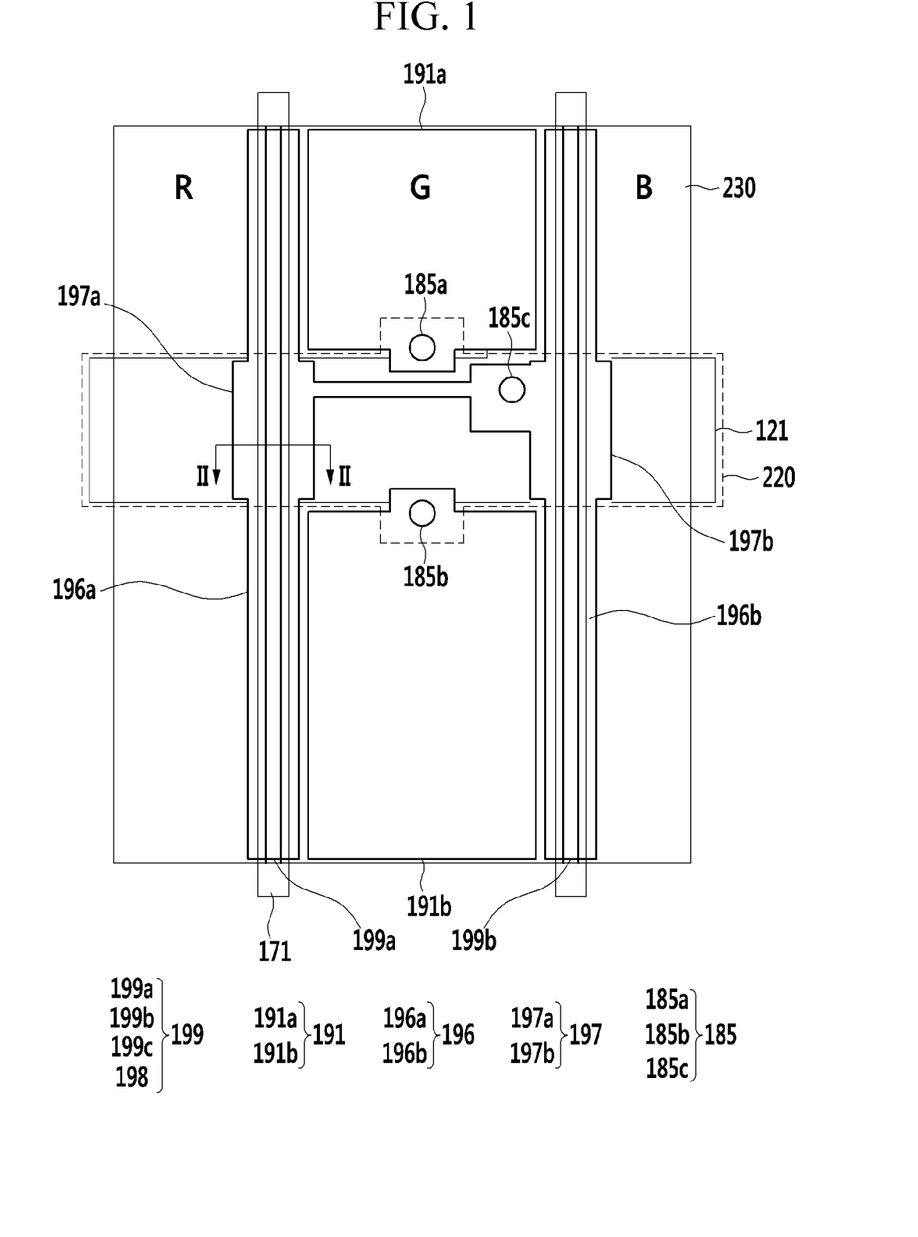
FIG. 1 is a plan view of an exemplary embodiment of a liquid crystal display according to the invention.
Figure 2:
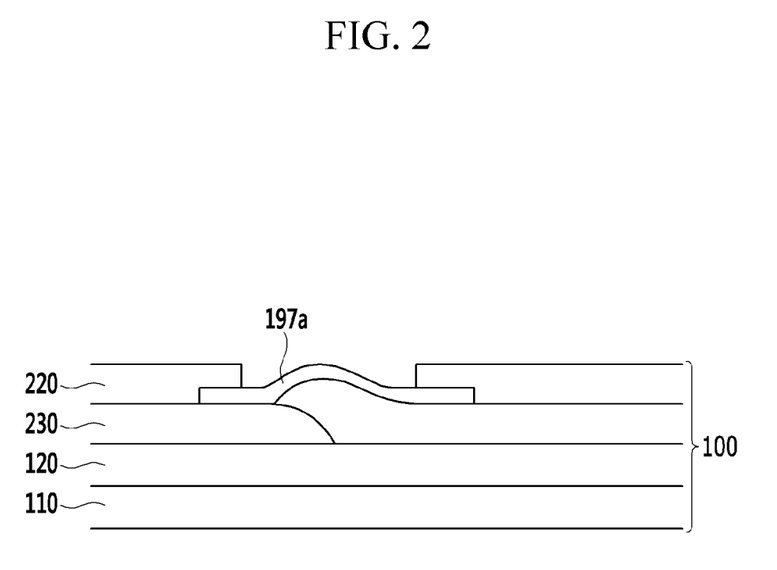
FIG. 2 is a cross-sectional view taken along line II-II of FIG. 1.

FIG. 1 is a plan view of an exemplary embodiment of a liquid crystal display according to the invention and FIG. 2 is a cross-sectional view taken along line II-II of FIG. 1.

Referring to FIGS. 1 and 2, a film structure 120 including a gate line 121 and a data line 171 is positioned on a lower substrate 110.

As illustrated in FIG. 1, the gate line 121 is elongated to mainly extend in a horizontal direction and transfers a gate signal.

As illustrated in FIG. 1, the data line 171 is elongated to mainly extend in a vertical direction and transfers a data signal. The data line 171 intersects the gate line 121.

Further, the film structure 120 includes a thin film transistor. The thin film transistor is a switching element. The switching element may include three terminals such as a control terminal, an input terminal and an output terminal, which will be described below in detail.

A plurality of color filters 230 are positioned on the film structure 120. The plurality of color filters 230 includes a red color filter (R), a green color filter (G) and a blue color filter (B). For convenience of explanation, a red color filter, a green color filter and a blue color filter only are illustrated herein, but a color filter 230 representing other colors may be further provided.

Further, the plurality of color filters 230 may each be elongated in the vertical direction to be formed in a striped-shape. The plurality of color filters 230 may be arranged in the horizontal direction and be disposed parallel to each other. Opposing edges of a color filter are disposed to overlap color filters adjacent thereto.

A pixel electrode 191 and a shielding electrode 199 are positioned on the plurality of color filters 230.

The pixel electrode 191 includes a first sub-pixel electrode 191a and a second sub-pixel electrode 191b. The first sub-pixel electrode 191a and the second sub-pixel electrode 191b are disposed to be spaced apart from each other such as at a constant interval. That is, the first sub-pixel electrode 191a and the second sub-pixel electrode 191b may be disposed to be spaced apart from each at opposing sides of the gate 121.

Figure 3:
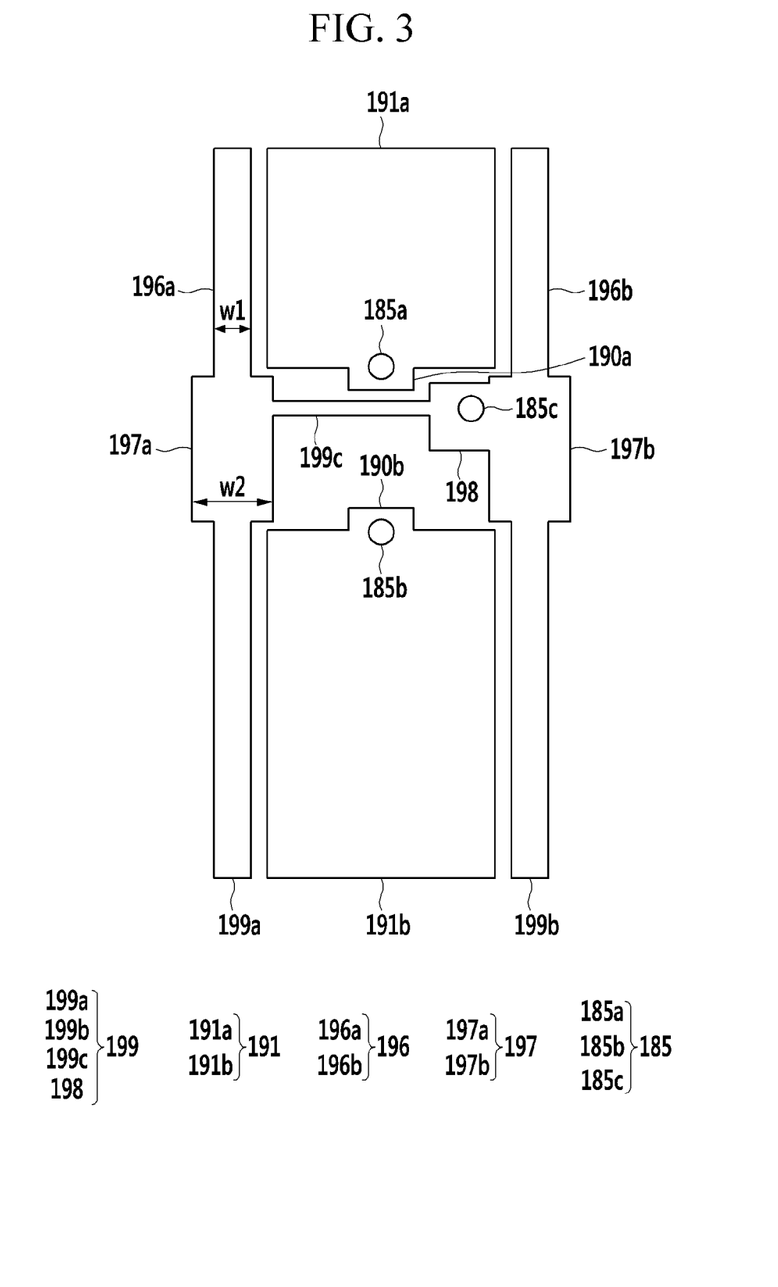
FIG. 3 is a plan view illustrating an exemplary embodiment of a pixel electrode and a shielding electrode in the liquid crystal display of FIG. 1.

As illustrated in FIG. 3, the first sub-pixel electrode 191a and the second sub-pixel electrode 191b are each provided with protrusions 190 extended from main portions thereof. That is, the first sub-pixel electrode 191a is provided with a first protrusion 190a extended from a main portion thereof and the second sub-pixel electrode 191b is provided with a second protrusion 190b extended from a main portion thereof. The first protrusion 190a and the second protrusion 190b are respectively extended to protrude from the main portions of the pixel electrode 191 and toward the gate line 121. The first protrusion 190a and the second protrusion 190b may be disposed to face each other.

The shielding electrode 199 is positioned on the color filter 230. That is, the shielding electrode 199 may be positioned at a portion where the color filters 230 overlap each other. As illustrated in FIG. 3, the shielding electrode 199 includes a first shielding electrode 199a, a second shielding electrode 199b, an extension 198 and a horizontal part 199c. The first shielding electrode 199a and the second shielding electrode 199b may be disposed at opposing sides of the pixel electrode 191.

The shielding electrode 199 collectively includes the first shielding electrode 199a, the second shielding electrode 199b, the extension 198 and the horizontal part 199c which are not separately disposed from each other (e.g., are continuously extended from each other) and connected to form a single, unitary, indivisible member. Further, the shielding electrodes 199 of adjacent pixels may also be connected to each other so as to form a single, unitary, indivisible member across the adjacent pixels.

As illustrated in FIG. 3, the first shielding electrode 199a and the second shielding electrode 199b each include a vertical part 196 and an expanded part 197. The vertical part 196 is elongated in an extension direction parallel to that of the data line 171. The vertical part 196 may have a shape similar to a plane shape of the data line 171. That is, the plane shape of the vertical part 196 may have a rectangular shape in the plan view. The vertical part 196 may include the first vertical part 196a which is a portion of the first shielding electrode 199a and a second vertical part 196b which is a portion of the second shielding electrode 199b.

The expanded part 197 is connected to the vertical part 196 and includes a first expanded part 197a which is a portion of the first shielding electrode 199a and a second expanded part 197b which a portion of the second shielding electrode 199b. The first expanded part 197a and the second expanded part 197b are positioned between the first sub-pixel electrode 191a and the second sub-pixel electrode 191b adjacent in the vertical direction. The first and second vertical parts 196a and 196b may collectively include portions respectively extending from opposing edges of the first and second expanded parts 197a and 197b.

As represented by the first expanded part 197a illustrated in FIG. 2, opposing edges of the expanded part 197 may be positioned under a light blocking member 220. A width of the vertical part 196 and the expanded part 197 is taken perpendicular to an extension direction thereof. As illustrated in FIG. 3, a width w2 of the expanded part 197 may be larger than a width w1 of the vertical part 196. As such, the shielding electrode 199 and the light blocking member 220 overlap each other and therefore the light leakage may be blocked.

The extension 198 of the shielding electrode 199 may be connected to the expanded part 197. That is, as illustrated in FIGS. 1 and 3, the extension 198 may be connected to the second expanded part 197b.

The protrusions 190 of the pixel electrode 191 and the extension 198 of the shielding electrode 199 may each overlap with a contact hole 185. That is, a first contact hole 185a may overlap the first protrusion 190a, a second contact hole 185b may overlap the second protrusion 190b, and a third contact hole 185c may overlap the extension 198.

The first contact hole 185a and the second contact hole 185b may be respectively also disposed to overlap a portion of the first sub-pixel electrode 191a except the first protrusion 190a and a portion of the second sub-pixel electrode 191b except the second protrusion 190b. The overlapped area of the first contact hole 185a and the portion of the first sub-pixel electrode 191*a* may be less than about 50% of a total planar area of the first contact hole 185*a* to reduce or effectively prevent a reduction in transmittance. Similarly, the overlapped area of the second contact hole 185*b* and the portion of the second sub-pixel electrode 191*b* may be less than about 50% of a total planar area of the second contact hole 185*b*.

The horizontal part 199*c* of the collective shielding electrode 199 connects the first shielding electrode 199*a* to the second shielding electrode 199*b*. That is, the horizontal part 199*c* may be connected to the first expanded part 197*a* and the extension 198 to connect the first shielding electrode 199*a* and the second shielding electrode 199*b* to each other. The horizontal part 199*c* may be positioned on the gate line 121 and may be positioned between the first sub-pixel electrode 191*a* and the second sub-pixel electrode 191*b*, in the plan view.

The light blocking member 220 is elongated in the horizontal direction to be positioned on the plurality of color filters 230 adjacent to each other in the horizontal direction. As illustrated in FIG. 1, the light blocking member 220 is elongated to extend along the gate line 121.

Figure 4:
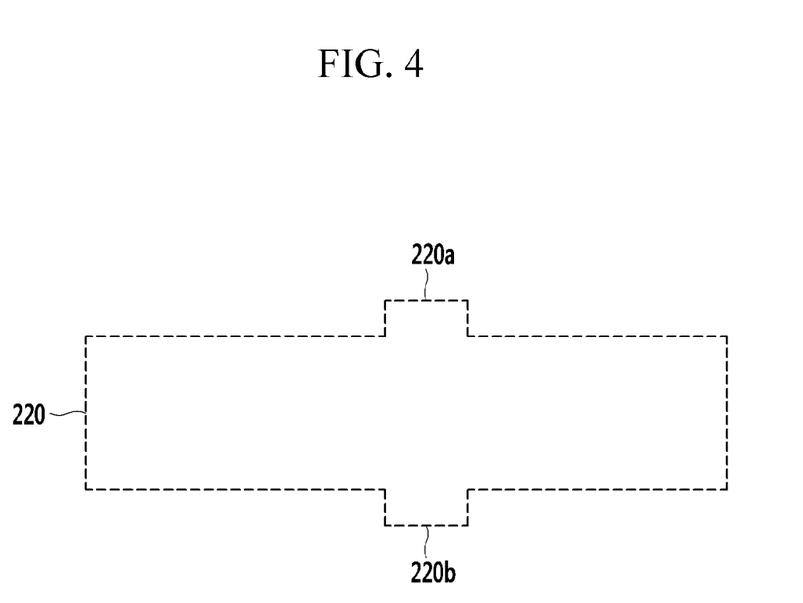
FIG. 4 is a plan view illustrating an exemplary embodiment of a light blocking member in the liquid crystal display of FIG. 1.

Further, as illustrated in FIGS. 1 and 4, the light blocking member 220 includes cover parts 220*a* and 220*b* extending from a main portion thereof. The cover parts 220*a* and 220*b* may be disposed a position corresponding to the protrusion 190 of the pixel electrode 191. The cover parts 220*a* and 220*b* may be elongated from the main portion of the light blocking member 220 to protrude toward the pixel electrode 191.

The first cover part 220*a* of the light blocking member 220 may be disposed at a position corresponding to the first protrusion 190*a* of the first sub-pixel electrode 191*a* and the second cover part 220*b* of the light blocking member 220 may be disposed at a position corresponding to the second protrusion 190*b* of the second sub-pixel electrode 191*b*. The first cover part 220*a* and the second cover part 220*b* are disposed to cover the contact hole 185 which is overlapped with the first protrusion 190*a* and the second protrusion 190*b*. As described with reference to FIGS. 1 to 4, according to one or more exemplary embodiment of the invention, the width of the expanded part 197 of the shielding electrode 199 is wider than that of the vertical part 196 of the shielding electrode 199 and thus the shielding electrode 199 and the light blocking member 220 overlap each other at the area where adjacent color filters overlap each other, thereby preventing the light leakage at an area where adjacent color filters overlap each other.

Hereinafter, the liquid crystal display embodying the exemplary embodiment of FIG. 1 will be described with reference to FIGS. 5 to 7.

Figure 5:
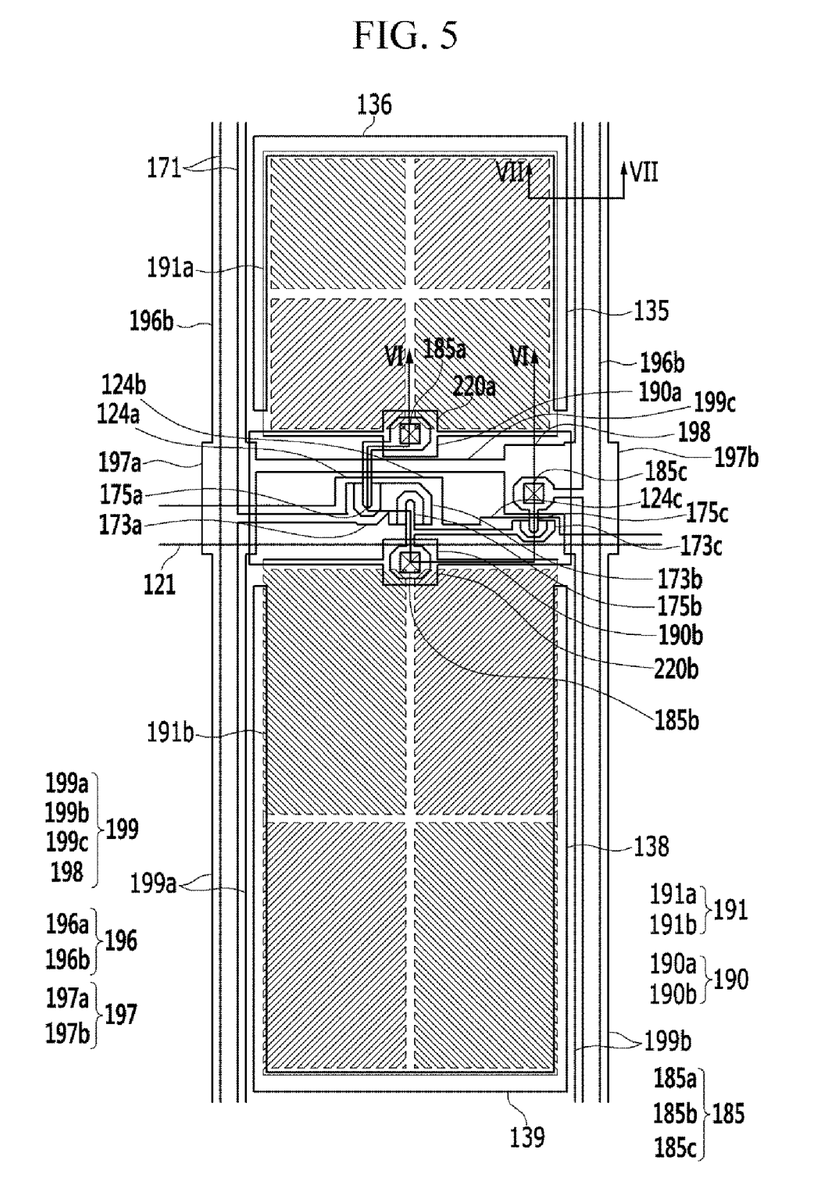
FIG. 5 is a plan view illustrating an exemplary embodiment of a structure within the liquid crystal display of FIG. 1.
Figure 6:
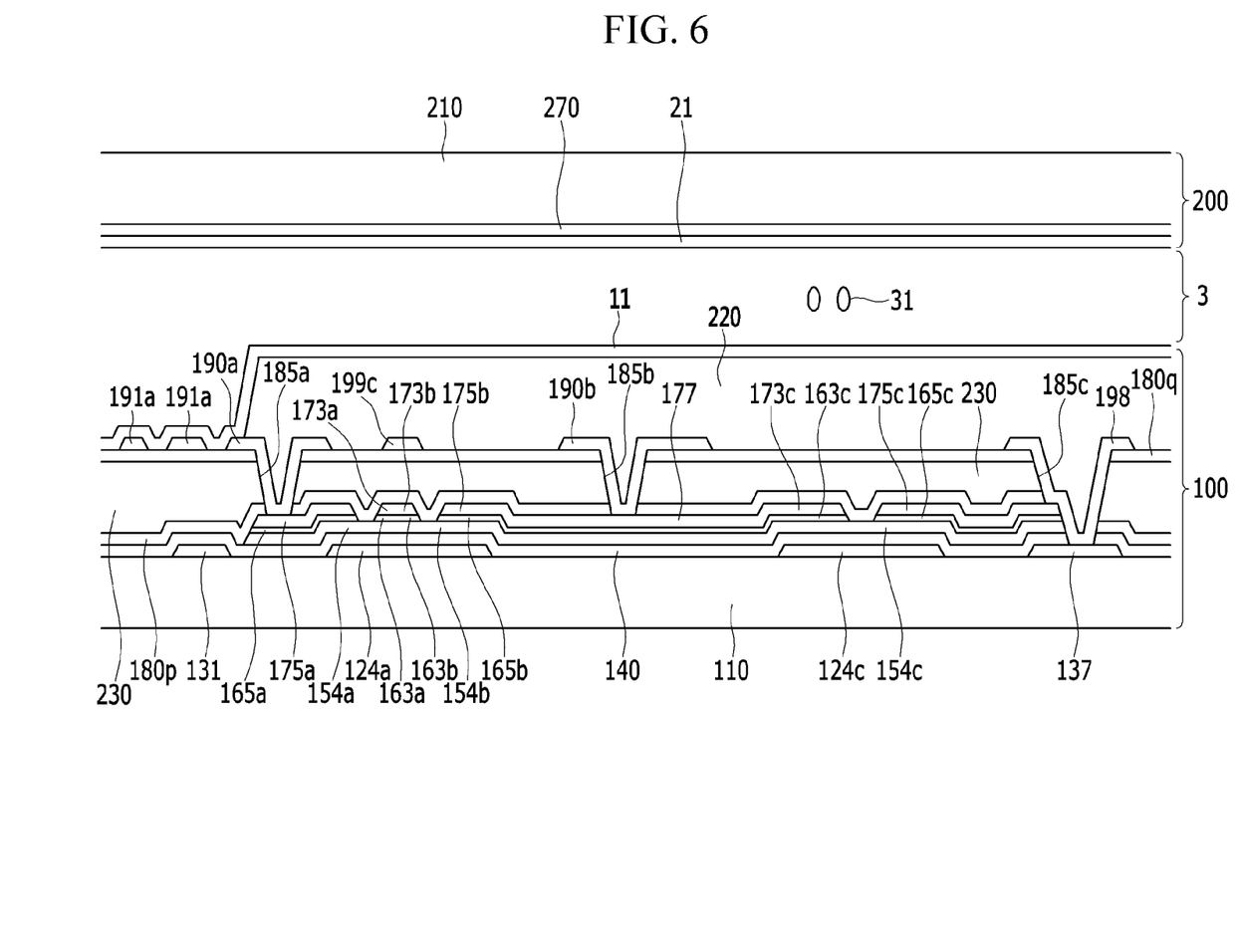
FIG. 6 is a cross-sectional view taken along line VI-VI of FIG. 5.
Figure 7:
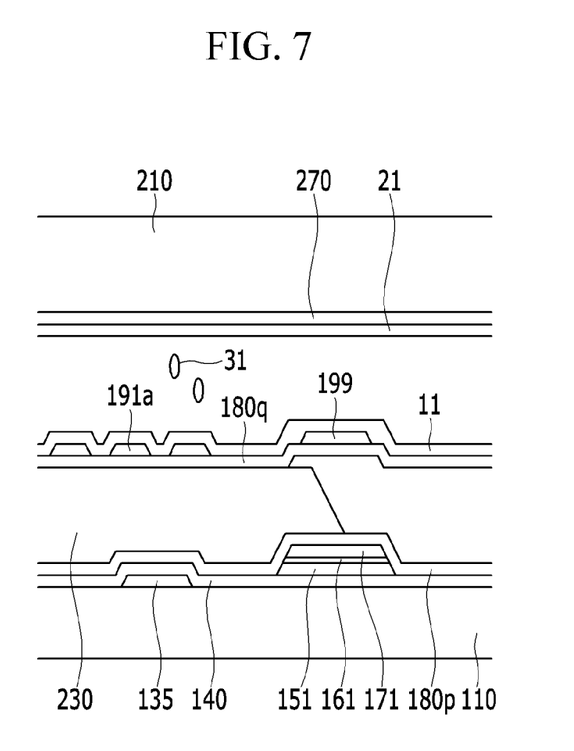
FIG. 7 is a cross-sectional view taken along line VII-VII of FIG. 5.

FIG. 5 is a plan view illustrating an exemplary embodiment of a structure within the liquid crystal display of FIG. 1, FIG. 6 is a cross-sectional view taken along line VI-VI of FIG. 5, and FIG. 7 is a cross-sectional view taken along line VII-VII of FIG. 5.

Referring to FIGS. 5 and 7, the liquid crystal display includes a lower display panel 100 and an upper display panel 200 facing each other, a liquid crystal layer 3 including a liquid crystal molecule 31 interposed between the two display panels 100 and 200. A pair of polarizers (not illustrated) may be attached outer surfaces of the display panels 100 and 200.

First, the lower display panel 100 will be described.

A gate conductor which includes the gate line 121 and a reference voltage line 131 is disposed on a first insulating (e.g., lower) substrate 110 including transparent glass, plastic, or the like. A distal or terminal end of the gate line 121 includes a relatively wide end (not illustrated) so as to be connected to other layers or external driving circuits. The gate line 121 includes therein a first gate electrode 124*a*, a second gate electrode 124*b* and a third gate electrode 124*c*. The reference voltage line 131 includes first storage electrodes 135 and 136 and a reference electrode 137. Second storage electrodes 138 and 139, which are not connected to the reference voltage line 131 but overlap a second sub-pixel electrode 191*b*, are also disposed on the first insulating substrate 110.

A gate insulating layer 140 is positioned on the gate line 121 and the reference voltage line 131 of the gate conductor. A first semiconductor layer 154*a*, a second semiconductor layer 154*b* and a third semiconductor layer 154*c* are positioned on the gate insulating layer 140. A plurality of ohmic contacts 163*a*, 165*a*, 163*b*, 165*b*, 163*c* and 165*c* is disposed on the semiconductor layers 154*a*, 154*b* and 154*c*.

A data conductor including a plurality of data lines 171 including a first source electrode 173*a* and a second source electrode 173*b*, a first drain electrode 175*a*, a second drain electrode 175*b*, a third source electrode 173*c* and a third drain electrode 175*c* is positioned on the ohmic contacts 163*a*, 165*a*, 163*b*, 165*b*, 163*c* and 165*c* and the gate insulating layer 140. In an exemplary embodiment of manufacturing a display device, the data conductor, the semiconductor positioned therebeneath, and the ohmic contact may be simultaneously formed using a single mask such that planar shapes of these elements correspond to each other.

The data line 171 may include at a distal or terminal end thereof, a relatively wide tip portion (not illustrated) for connecting to another layer or an external driving circuit, a semiconductor layer 151 and an ohmic contact 161 in the same plane form. The first gate electrode 124*a*, the first source electrode 173*a* and the first drain electrode 175*a* forms a first thin film transistor together with the first (island-type) semiconductor layer 154*a* and a channel of a first thin film transistor is formed by a portion of the first semiconductor layer 154*a* exposed between the first source electrode 173*a* and the first drain electrode 175*a*. Similarly, the second gate electrode 124*b*, the second source electrode 173*b* and the second drain electrode 175*b* form a second thin film transistor together with a second (island-type) semiconductor layer 154*b* and a channel of the second thin film transistor is formed by a portion of the second semiconductor layer 154*b* exposed between the second source electrode 173*b* and the second drain electrode 175*b*. The third gate electrode 124*c*, the third source electrode 173*c* and the third drain electrode 175*c* form a third thin film transistor together with the third (island-type) semiconductor layer 154*c* and a channel of the third thin film transistor is formed by a portion of the third semiconductor layer 154*c* exposed between the third source electrode 173*c* and the third drain electrode 175*c*. The second drain electrode 175*b* is connected to the third source electrode 173*c* and includes an expansion 177 which has a relatively wide planar area compared to a remaining portion of the second drain electrode 175*b*.

A first passivation layer 180*p* is positioned on the data conductor 171, 173*a*, 173*b*, 173*c*, 175*a*, 175*b* and 175*c* and the exposed semiconductors layers 154*a*, 154*b* and 154*c* respectively disposed between data conductor portions. The first passivation layer 180*p* may be an inorganic insulating layer including silicon nitride, silicon oxide, or the like. The first passivation layer 180*p* may reduce or effectively prevent a pigment of a color filter 230 from flowing in the exposed semiconductor layers 154*a*, 154*b* and 154*c*.

The plurality of color filters 230 is disposed on the first passivation layer 180*p*. The color filter 230 may include organic insulating material.

The plurality of color filters 230 may be arranged in a horizontal direction and parallel to each other, and may be disposed to overlap each other in the horizontal direction by a predetermined interval or overlapping area.

The color filter 230 may uniquely display one among primary colors. An example of the primary colors may include the three primary colors, such as red, green and blue, or yellow, cyan magenta, and the like. In an exemplary embodiment, the color filter 230 may display a mixed color of the primary colors or a white color, in addition to the primary colors.

A second passivation layer 180q is positioned on the color filter 230. The second passivation layer 180q may be an inorganic insulting layer including silicon nitride, silicon oxide, or the like. The second passivation layer 180q reduces of effectively prevents the color filter 230 from lifting and suppresses the pollution of the liquid crystal layer 3 due to organic materials, such as a solvent inflowing from the color filter 230. The second passivation layer 180q thereby reduces or effectively prevents defects, such as an afterimage which may occur at the time of driving the screen, from occurring, due to such lifting and/or solvent inflow.

The first contact hole 185a and the second contact hole 185b exposing the first drain electrode 175a and the second drain electrode 175b are defined in each of the first passivation layer 180p, the color filter 230 and the second passivation layer 180q. A third contact hole 185c exposing both of the reference electrode 137 and the third drain electrode 175c is defined in the first passivation layer 180p, the second passivation layer 180q and the gate insulating layer 140. The reference electrode 137 and the third drain electrode 175c which are exposed through the third contact hole 185c are electrically connected to each other at the third contact hole 185c. The first contact hole 185a may be disposed overlapping the first protrusion 190a of the pixel electrode 191, the second contact hole 185b may be disposed overlapping the second protrusion 190b of the pixel electrode 191, and the third contact hole 185c may be disposed overlapping the extension 198 of the shielding electrode 199.

A plurality of pixel electrodes 191 are disposed on the second passivation layer 180q. Each of the pixel electrodes 191 may include first and second sub-pixel electrodes 191a and 191b adjacent to each other in a column (e.g., vertical) direction and separated from each other, having the gate line 121 disposed therebetween. The pixel electrode 191 may include a transparent conductive material such as indium tin oxide ("ITO") and indium zinc oxide ("IZO") or may also include a reflective metal such as aluminum, silver, chromium, or an alloy thereof.

Figure 8:
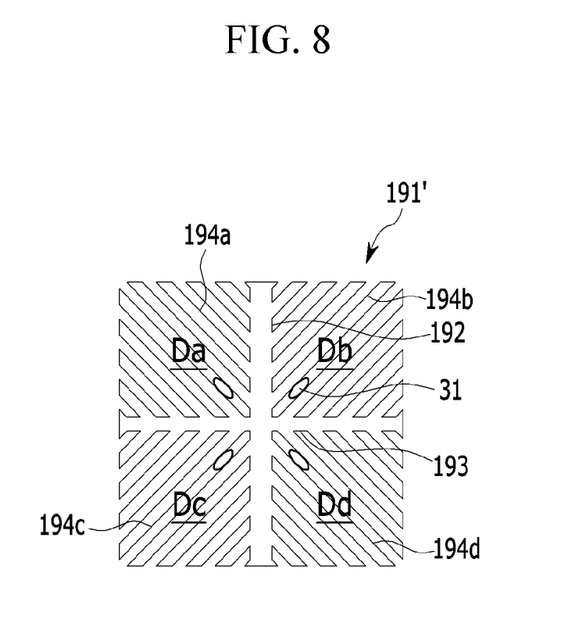
FIG. 8 is a plan view illustrating an exemplary embodiment of a basic region of a pixel electrode of a liquid crystal display according to the invention.

Each of the first sub-pixel electrode 191a and the second sub-pixel electrode 191b each include a basic electrode 191' in illustrated in FIG. 8 or at least one modification thereof.

The first sub-pixel electrode 191a and the second sub-pixel electrode 191b are physically and electrically connected to the first drain electrode 175a and the second drain electrode 175b, respectively, through the first and second contact holes 185a and 186b and are applied with a data voltage from the first drain electrode 175a and the second drain electrode 175b. Some of the data voltage applied to the second drain electrode 175b is divided by the third source electrode 173c, such that a magnitude of the voltage applied to the first sub-pixel electrode 191a is larger than that of the voltage applied to the second sub-pixel electrode 191b.

Each of the first sub-pixel electrode 191a and the second sub-pixel electrode 191b include a protrusion protruding from a main portion thereof and toward the gate line 121. The protrusion 190 of the pixel electrode 191 may be positioned under the light blocking member 220 in a cross-sectional thickness direction. The first sub-pixel electrode 191a is provided with the first protrusion 190a and the second sub-pixel electrode 191b is provided with the second protrusion 190b. The first protrusion 190a and the second protrusion 190b may be positioned in an area between main portions of the first sub-pixel electrode 191a and the second sub-pixel electrode 191b. The first protrusion 190a may overlap with the first contact hole 185a and the second protrusion 190b may overlap with the second contact hole 185b. Due to the expanded part 197 of the shielding electrode 199 being widened near an area of the thin film transistor, an area in which to dispose the thin film transistor may be reduced. Since the area in which to dispose the thin film transistor is reduced, the contact hole 185 is disposed overlapping the protrusion 190 of the pixel electrode 191 to provide a space for the thin film transistor.

The first sub-pixel electrode 191a and the second sub-pixel electrode 191b to which the data voltage is applied generate an electric field, along with a common electrode 270 of the upper display panel 200 to be described below, thereby determining an orientation of liquid crystal molecules 31 of the liquid crystal layer 3 between the two electrodes 191 and 270. The luminance of light passing through the liquid crystal layer 3 along the orientation of the liquid crystal molecules determined as described above is changed.

The shielding electrode 199 may be positioned in the same layer as pixel electrode 191 among layers of the lower display panel 100 disposed on the first insulating (e.g., lower) substrate 110.

The shielding electrode 199 may be positioned to overlap the data line 171 and may be positioned on a portion where the color filters 230 overlap each other. The shielding electrode 199 may have the same or similar plane shape of the data line 171 in the plan view. The collective shielding electrode 199 includes the first shielding electrode 199a and the second shielding electrode 199b which are positioned at opposing sides of the pixel electrode 191. The collective shielding electrode 199 further includes the horizontal part 199c which connects the first shielding electrode 199a and the second shielding electrode 199b to each other, such as being connected to the extension 198 of the second shielding electrode 199b. The collective shielding electrode 199 includes the first shielding electrode 199a, the second shielding electrode 199b, the extension 198 and the horizontal part 199c which are not separately formed from each other to form a single, unitary indivisible member.

The first shielding electrode 199a and the second shielding electrode 199b each include the vertical part 196 and the expanded part 197. The vertical part 196 is elongated to extend parallel with the data line 171, and the expanded part 197 is connected to the vertical part 196. Referring to FIG. 2, opposing edges of the expanded part 197 may be positioned under the light blocking member 220 in the cross-sectional thickness direction. The expanded part 197 may be positioned in an area between the first sub-pixel electrode 191a and the second sub-pixel electrode 191b adjacent to each other in the column (e.g., vertical) direction in the plan view. The width w2 of the expanded part 197 may be larger than the width w1 of the vertical part 196.

The first shielding electrode 199a includes the first vertical part 196a and the first expanded part 197a and the second shielding electrode 199b includes the second vertical part 196b and the second expanded part 197b. The extension 198 may further extend from the second expanded part 197 of the second shielding electrode 199b. The extension 198 may overlap the third contact hole 185c.

The horizontal part 199c of the shielding electrode 199 is elongated to extend parallel with the gate line 121 and is positioned in the space between the first sub-pixel electrode 191a and the second sub-pixel electrode 191b adjacent to each other in the column (e.g., vertical) direction. The horizontal part 199c connects the extension 198 of the second shielding electrode 199b and the expanded part 197a of the first shielding electrode 199a to each other.

The electric field between the pixel and common electrodes 191 and 270 may be stabilized with the above-described structure of the shielding electrode 199 and the common electrode 270 and thus the liquid crystal may be controlled.

The shielding electrode 199 may include transparent conductive material, such as ITO and IZO, or a reflective metal such as aluminum, silver, chromium, or an alloy thereof. That is, the shielding electrode 199 may include a same material as the pixel electrode 191 or may include different materials from the pixel electrode 191. In an exemplary embodiment of manufacturing a display device, the shielding electrode 199 and the pixel electrode 191 may be simultaneously formed such as using the same mask, to dispose the shielding electrode 199 and the pixel electrode 191 in a same layer among layers of the lower display panel 100 disposed on the first insulating (e.g., lower) substrate 110.

The shielding electrode 199 is applied with the same voltage as the common electrode 270, and therefore the electric field is not generated between the shielding electrode 199 and the common electrode 270. Since the electric field is not generated between the shielding electrode 199 and the common electrode 270, liquid crystal molecules 31 are not oriented between the shielding electrode 199 and the common electrode 270 are not oriented. Therefore, the liquid crystal molecules 31 which are positioned as described above define a black state of the liquid crystal display, and thus may serve as the light blocking member 220.

Therefore, in one or more exemplary embodiment of the liquid crystal display according to the invention, the shielding electrode 199 may provide a light shielding function in addition to the light blocking member 220 providing a light shielding function.

The light blocking member 220 is positioned on the second passivation layer 180q and the pixel electrode 191. The light blocking member 220 is elongated to extend parallel with the gate line 121 and is disposed to cover the gate line 121 and the thin film transistor at a pixel non-display area.

Further, the light blocking member 220 includes cover parts 220a and 220b to cover the contact hole 185 which overlaps the protrusion 190 of the pixel electrode 191. That is, the light blocking member 220 includes the first cover part 220a to cover the first protrusion 190a of the first pixel electrode 191a and includes the second cover part 220b to cover the second protrusion 190b of the second pixel electrode 191b.

Although not illustrated herein, a spacer may be positioned on the light blocking member 220. The spacer may include a main column spacer and a sub-column spacer which have different steps from each other. The main column spacer serves to support the space between the upper display panel 200 and the lower display panel 100 and the sub-column spacer serves to assist a role of the main column spacer by supporting the space between the upper display panel 200 and the lower display panel 100.

A lower alignment layer 11 is positioned on the pixel electrode 191 and the light blocking member 220.

Hereinafter, the upper display panel 200 will be described.

The common electrode 270 is disposed on a second insulating substrate 210. The common electrode 270 may include a transparent conductor material, such as ITO and IZO.

An upper alignment layer 21 is disposed on the common electrode 270.

The liquid crystal layer 3 includes the plurality of liquid crystal molecules 31. The liquid crystal molecules 31 are aligned to be perpendicular to the surfaces of the two substrates 110 and 210 and are oriented to have a pretilt inclined in the same direction as a length direction of a slotted pattern of the pixel electrode 191, in the state in which a voltage is not applied to the two field generating electrodes 191 and 270.

Hereinafter, the basic electrode of the pixel electrode will be described with reference to FIG. 8.

FIG. 8 is a plan view illustrating an exemplary embodiment of a basic region of a pixel electrode of a liquid crystal display according to the invention.

Referring to FIG. 8, the overall shape of the basic electrode 191' is a quadrangle and includes a stem part which is configured of a horizontal stem part 193 and a vertical stem part 192 orthogonal thereto. Further, the basic electrode 191' is divided into a first subregion Da, a second subregion Db, a third subregion Dc and a fourth subregion Dd by the horizontal stem part 193 and the vertical stem part 192. The first to fourth subregions Da to Dd respectively include a plurality of first fine branch parts 194a, a plurality of second fine branch parts 194b, a plurality of third fine branch parts 194c and a plurality of fourth fine branch parts 194d.

The first fine branch parts 194a obliquely extend in an upper-left extension direction from the horizontal stem part 193 or the vertical stem part 192, and the second fine branch parts 194b obliquely extend in an upper-right extension direction from the horizontal stem part 193 or the vertical stem part 192. The third fine branch parts 194c extend in a lower-left extension direction from the horizontal stem part 193 or the vertical stem part 192, and the fourth fine branch parts 194d obliquely extend in a lower-right extension direction from the horizontal stem part 193 or the vertical stem part 192.

The first to fourth fine branch parts 194a, 194b, 194c and 194d respectively form an angle of approximately 45° or approximately 135° with respect to the gate line 121 or the horizontal stem part 193. Further, extension directions of the fine branch parts 194a, 194b, 194c and 194d of two neighboring subregions among subregions Da, Db, Dc and Db may be orthogonal to each other.

Widths of the fine branch parts 194a, 194b, 194c and 194d are taken perpendicular to extension directions thereof. Widths of the fine branch parts 194a, 194b, 194c and 194d may range from about 2.5 micrometers (μm) to about 5.0 μm. A respective width-direction interval between the adjacent fine branch parts 194a, 194b, 194c and 194d within one sub-pixel region Da, Db, Dc and Dd may range from about 2.5 μm to about 5.0 μm.

According to another exemplary embodiment of the invention, the widths of the fine branch parts 194a, 194b, 194c and 194d may increase along the extension directions thereof toward the horizontal stem part 193 or the vertical stem part 192. A difference between the widest width and the narrowest width within one of the fine branch parts 194a, 194b, 194c and 194d may range from about 0.2 μm to about 1.5 μm.

The first sub-pixel electrode 191a and the second sub-pixel electrode 191b are connected to the first drain electrode 175a and the second drain electrode 175b, respectively, through the first and second contact holes 185a and 186b, and are applied with a data voltage from the first drain electrode 175a and the second drain electrode 175b. Sides of the first to fourth fine branch parts 194a, 194b, 194c and 194d distort an electric field to generate a horizontal component which determines an inclined direction of the liquid crystal molecules 31. The horizontal component of the electric field is substantially parallel to the sides of the first to fourth fine branch parts 194a, 194b, 194c and 194d.

Therefore, as illustrated in FIG. 8, the liquid crystal molecules 31 are respectively inclined in a direction parallel with a length (e.g., extension) direction of the fine branch parts 194a, 194b, 194c and 194d. A single one basic pixel electrode 191' includes the four subpixel regions Da, Db, Dc and Dd in which the length directions of the fine branches 194a, 194b, 194c and 194d are different from each other. With the length directions of the fine branches 194a, 194b, 194c and 194d are different from each other the direction in which the liquid crystal molecules 31 are inclined is approximately four directions such that the liquid crystal layer 3 is formed with four domains in which the alignment directions of the liquid crystal molecules 31 are different. As such, when the direction in which the liquid crystal molecules 31 are inclined is various, a reference viewing angle of the liquid crystal display is increased.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display, comprising:
a first display panel comprising:
  a first insulating substrate;
  a gate line and a data line on the first insulating substrate, intersecting each other and being insulated from each other;
  a thin film transistor connected to the gate line and the data line;
  a pixel electrode connected to the thin film transistor, including a first sub-pixel electrode and a second sub-pixel electrode spaced apart from each other;
  a shielding electrode member on the data line, including a first shielding electrode and a second shielding electrode respectively at opposing sides of the pixel electrode, each of the first shielding electrode and the second shielding electrode including:
    an expanded part between the first sub-pixel electrode and the second sub-pixel electrode, and
    a vertical part elongated from the expanded part in a first direction parallel to the data line; and
  a light blocking member elongated in a second direction crossing the first direction to overlap the thin film transistor,
  wherein
    a width in the second direction of the expanded part between the first sub-pixel electrode and the second sub-pixel electrode is larger than that of the vertical part, and
    opposing edges of the expanded part between the first sub-pixel electrode and the second sub-pixel electrode overlap the elongated light blocking member overlapping the thin film transistor.

2. The liquid crystal display of claim 1, wherein:
at least one of the first sub-pixel electrode and the second sub-pixel electrode includes a protrusion protruding toward the gate line.

3. The liquid crystal display of claim 2, wherein:
both the first and second sub-pixel electrodes include the protrusion, and the protrusion of the first sub-pixel electrode and the protrusion of the second sub-pixel electrode face each other.

4. The liquid crystal display of claim 2, wherein:
the shielding electrode member further includes an extension protruded in the second direction from one of the expanded parts between the first sub-pixel electrode and the second sub-pixel electrode.

5. The liquid crystal display of claim 4, further comprising:
a reference voltage line on the first insulating substrate; and
a plurality of contact holes respectively exposing the thin film transistor and the reference voltage line,
wherein:
at least one protrusion of the pixel electrode and the extension of the shielding electrode member overlaps a contact hole among the plurality of contact holes.

6. The liquid crystal display of claim 5, wherein:
the contact hole overlaps a portion of the pixel electrode except the at least one protrusion, and where the overlapped area of the contact hole and the portion of the pixel electrode is less than about 50% of a planar area of the contact hole.

7. The liquid crystal display of claim 4, wherein:
the shielding electrode member further includes a horizontal part elongated between the first and second sub-pixel electrodes, the horizontal part connecting the first and second shielding electrodes to each other.

8. The liquid crystal display of claim 7, wherein:
the extension of the shielding electrode member protrudes in the second direction from the expanded part of the second shielding electrode, and
the horizontal part of the shielding electrode member connects the expanded part of the first shielding electrode with the extension protruded from the expanded part of the second shielding electrode.

9. The liquid crystal display of claim 2, wherein:
the light blocking member extends along the gate line.

10. The liquid crystal display of claim 9, wherein:
the light blocking member includes a cover part which overlaps the protrusion of the at least one of the first sub-pixel electrode and the second sub-pixel electrode.

11. The liquid crystal display of claim 1, further comprising:
color filters overlapping the pixel electrode, edges of which overlap each other and the data line.

12. The liquid crystal display of claim 11, wherein:
the shielding electrode member overlaps the overlapping edges of the color filters.

13. The liquid crystal display of claim 1, wherein:
the shielding electrode member and the pixel electrode are in a same layer of the first display panel among layers on the first insulating substrate and include a same material.

14. The liquid crystal display of claim 1, further comprising a second display panel facing the first display panel, the second display panel comprising:
a second insulating substrate;
a common electrode on the second insulating substrate; and
a liquid crystal layer between the pixel electrode of the first display panel and the common electrode of the second display panel.

15. The liquid crystal display of claim 14, wherein:
the shielding electrode member receives with a same voltage as that received by the common electrode.

16. A method of manufacturing a liquid crystal display, comprising:
- providing a first display panel comprising:
  - disposing a gate line and a data line on a first insulating substrate, the gate and data lines intersecting each other and being insulated from each other;
  - disposing a thin film transistor connected to the gate line and the data line;
  - disposing a pixel electrode connected to the thin film transistor, the pixel electrode including a first sub-pixel electrode and a second sub-pixel electrode spaced apart from each other;
  - disposing a shielding electrode member on the data line, the shielding electrode member including a first shielding electrode and a second shielding electrode respectively at opposing sides of the pixel electrode, each of the first shielding electrode and the second shielding electrode including:
    - an expanded part between the first sub-pixel electrode and the second sub-pixel electrode, and
    - a vertical part elongated from the expanded part in a first direction parallel to the data line; and
  - disposing a light blocking member elongated in a second direction crossing the first direction to overlap the gate line and the thin film transistor,
  - wherein
  - a width in the second direction of the expanded part between the first sub-pixel electrode and the second sub-pixel electrode is larger than that of the vertical part, and
  - opposing edges of the expanded part between the first sub-pixel electrode and the second sub-pixel electrode overlap the elongated light blocking member overlapping the thin film transistor.

17. The method of claim 16, wherein the providing a first display panel further comprises:
- disposing pixel electrodes adjacent to each other in the second direction, and
- disposing color filters adjacent to each other in the second direction,
- wherein
- edges of the second direction adjacent color filters are disposed between the second direction adjacent pixel electrodes and overlapping each other, and
- the vertical part of the shielding electrode member overlaps the overlapping edges of the second direction adjacent color filters disposed between the second direction adjacent pixel electrodes.

18. The method of claim 16, wherein
- the disposing a shielding electrode member on the data line comprises extending one of the expanded parts between the first sub-pixel electrode and the second sub-pixel electrode spaced apart from each other in the first direction, and
- the disposing a pixel electrode connected to the thin film transistor comprises providing one of the first sub-pixel electrode and the second sub-pixel electrode with a protrusion protruding toward the gate line.

19. The method of claim 18, wherein the providing a first display panel further comprises:
- disposing a reference voltage line on the first insulating substrate; and
- defining a plurality of contact holes respectively exposing the thin film transistor and the reference voltage line,
- wherein at least one protrusion of the pixel electrode and the extension of the shielding electrode member overlaps a contact hole among the plurality of contact holes.

* * * * *